(No Model.)

E. B. ALLEN.
DISH WASHING MACHINE.

No. 460,420. Patented Sept. 29, 1891.

Witnesses:
E. C. Duffy
Chas. M. Weed

Inventor:
E. B. Allen
per O. E. Duffy
Attorney

UNITED STATES PATENT OFFICE.

EDWARD B. ALLEN, OF TERRE HAUTE, INDIANA.

DISH-WASHING MACHINE.

SPECIFICATION forming part of Letters Patent No. 460,420, dated September 29, 1891.

Application filed May 7, 1891. Serial No. 391,894. (No model.)

*To all whom it may concern:*

Be it known that I, EDWARD B. ALLEN, of Terre Haute, in the county of Vigo and State of Indiana, have invented certain new and useful Improvements in Dish-Washing Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in dish-washing machines.

The object of the invention is to provide an improved dish-washing machine exceedingly simple, durable, and effective in construction, and whereby dishes can be quickly and thoroughly washed with a minimum amount of labor. These objects are accomplished by and this invention consists in certain novel features of construction and in combinations of parts, more fully described hereinafter, and particularly pointed out in the claims.

Figure 1:
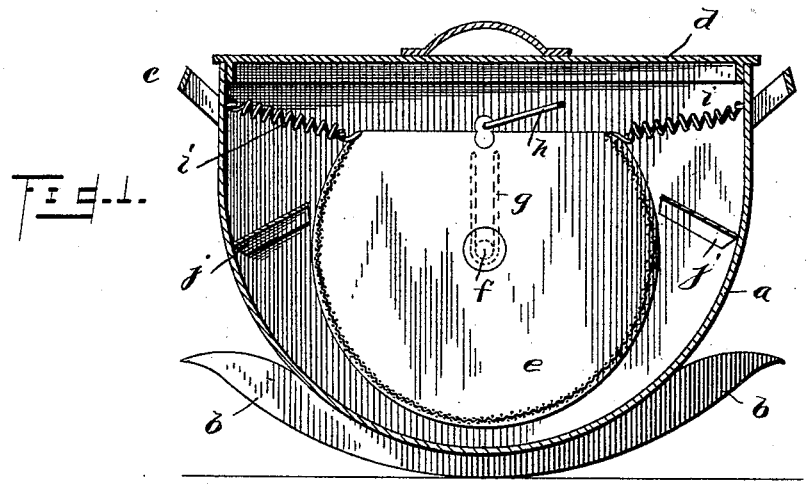
Figure 2:
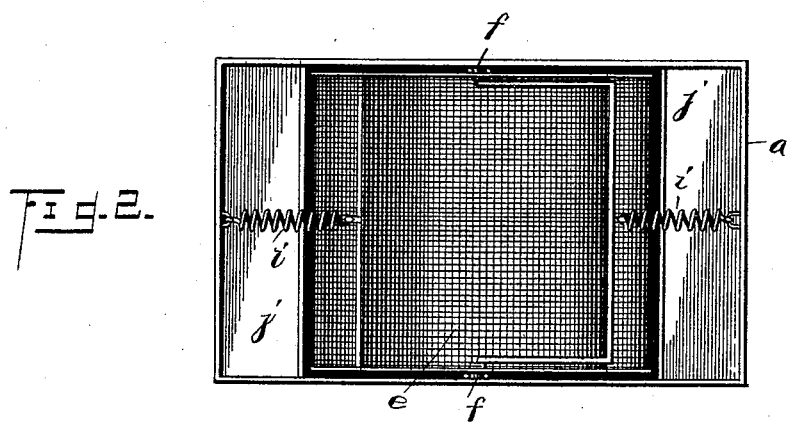
Figure 3:
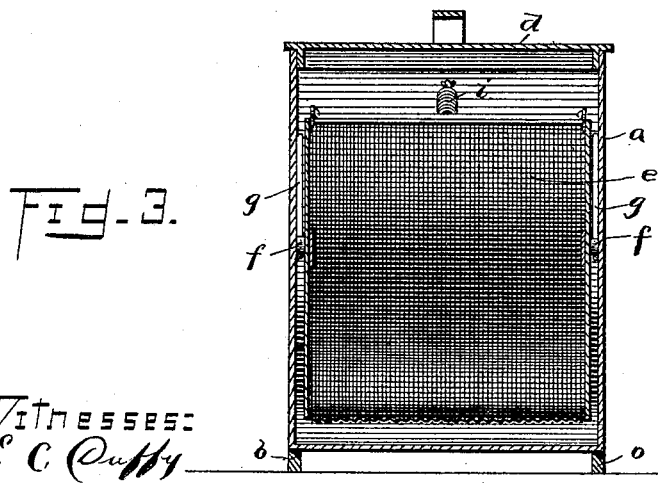

Referring to the accompanying drawings, Figure 1 is a cross-section of the machine. Fig. 2 is a top plan with the cover removed. Fig. 3 is a longitudinal section.

In the drawings, the reference-letter $a$ indicates the water or washing box or vessel open at the top and preferably having the rounded bottom, as shown, and mounted on rockers $b\ b$ to rock transversely and provided with side handles $cc$ and tightly-fitting cover $d$.

$e$ is the dish-holding vessel within the water-box and smaller than the internal capacity thereof and preferably cylindrical in shape and composed of the reticulated periphery, and the two heads having trunnions $ff$, resting in the lower ends of slots or bearing-brackets $g\ g$ at the internal ends of the water-box, so that the dish-receptacle can be lifted bodily out of the water-box with its contents by means of its bail $h$. The dish-receptacle is open at the top.

$i\ i$ are coiled springs removably secured to opposite sides of the opening thereinto and to the respective opposite sides of the water-box to prevent the dish-receptacle overturning or rocking too far or with too much force, and thereby prevent breakage of the dishes.

$j\ j$ are deflectors longitudinally located in the water-box near the upper portions of opposite sides thereof and on opposite sides of the dish-receptacle. These deflectors are transversely inclined up to dash the water with force into the dish-receptacle. Each deflector consists of a rigidly secured metal strip.

The operation of the device is as follows: A suitable quantity of soap or cleaning compound is placed in the water pan or box. The dish basket or receptacle is then placed in the water-box in its proper position and the springs attached. The dishes are then placed in said basket on edge or with face side up. Then a suitable quantity of hot water is poured in on the dishes and the cover placed on the water-box, and then the machine is rocked back and forth by the handles $c$, whereby the water is alternately thrown by the two deflectors with sufficient force to thoroughly wash the dishes in the basket. When the machine has been rocked a sufficient length of time, the cover is removed and rinsing-water can be poured in and the basket lifted out and the dishes are ready for wiping. The dishes can be removed immediately and set on edge in a dripping-screen, and they will dry without wiping. In large machines a vapor-burner can be attached to heat water.

It is evident that various changes may be resorted to in the form and arrangements of the parts described without departing from the spirit and scope of my invention. Hence I do not wish to limit myself to the precise construction herein set forth.

What I claim is—

1. The combination, with the rocking water-box, of the dish-basket longitudinally journaled in said box and springs to yieldingly hold it in its normal position, substantially as described.

2. The combination of the rocking water-box having the cover and side handles and internal angularly-arranged deflectors, the dish-basket longitudinally and removably journaled therein and having the open top and lifting-bail, and the springs removably secured to opposite sides of the basket and box to yieldingly hold the basket in its normal position.

3. The combination of the water-box having the open top provided with a lid and the rounded bottom provided with the rockers, the cylindrical dish-basket having the reticulated surface and the end trunnions removably mounted in the ends of said box, and the upwardly and inwardly inclined deflectors rigidly secured to the opposite sides of the water-box near the upper portions thereof, so as to throw the water as it moves along the rounded bottom of the box inwardly into the dish-basket.

4. The combination of the rocking water-box having the open top provided with the cover and the rounded bottom, the dish-basket horizontally located in such box and having end trunnions, the inner ends of the box having the bearings open at the top, whereby the dish-basket can be lifted out, said dish-basket being provided with the open top and the bail, and the deflectors located near the upper portions of the opposite sides of the water-box to throw the water into said basket.

In testimony that I claim the foregoing as my own I affix my signature in presence of two witnesses.

EDWARD B. ALLEN.

Witnesses:
 ISAAC H. C. ROYSE,
 JOSEPH G. ELDER.